March 10, 1925.                                        1,528,878
C. J. HOLSLAG
ELECTRIC ARC WELDING ELECTRODE
Filed Oct. 15, 1918
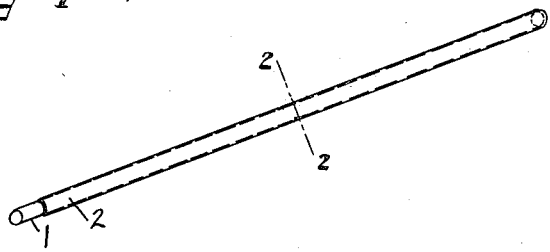
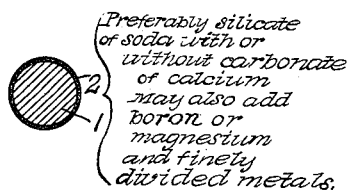
Preferably silicate of soda with or without carbonate of calcium may also add boron or magnesium and finely divided metals.
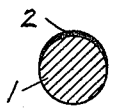
INVENTOR
CLAUDE J. HOLSLAG
Albion D. T. Libby
ATTORNEY Patented Mar. 10, 1925.

1,528,878

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC-WELDING ELECTRODE.

Application filed October 15, 1918. Serial No. 258,197.

*To all whom it may concern:*

Be it known that I, CLAUDE J. HOLSLAG, a citizen of the United States, residing at South Orange, in the county of Essex and State of New Jersey, have invented certain new and useful Improvements in Electric-Arc-Welding Electrodes, of which the following is a specification.

This invention relates to a metallic electrode suitable for electric arc welding and repairing and while adapted for use with both direct or alternating current, it is particularly adapted for use with the alternating current. This application is a continuation in major part of an application Serial No. 239,447 filed June 11, 1918, the claims of which have been subsequently transferred to this present application.

In the process of electric arc welding and repairing slag covered electrodes have been used to considerable extent, also complete envelopes or sleeves of some nature have been used around the welding electrode to hold the arc and also to make "slag." I have found these schemes to be entirely unnecessary in the operation of my method of electric arc welding, set forth in the above mentioned application and also in my Patent No. 1,305,362, issued June 3, 1919. These schemes besides being unnecessary, I have found to be detrimental to good welding in that the "slag" or "envelope" gets into the puddle or ahead of the arc tending to put the same out and to cause porous or spongy welds, particularly so when direct current is used. I do not want slag in or around the weld, neither do I want an "envelope" or "sleeve" around the electrode to sustain the arc, but rather a very thin coating of suitable material to prevent oxidization and secure a good weld.

It is, therefore, the object of this invention to provide an electrode that will produce a weld that is smooth, stronger and more uniform than that produced by a "slag" or "envelope" covered electrode or even bare electrodes.

By way of illustration, Figure 1 of the drawing attached hereto, shows an electrode with a partial coating over it, while—

Figure 2 is an enlarged section, on the line 2—2 of Figure 1.

Figure 3 is an enlarged section of my electrode with the coating all the way around the electrode.

In the various figures, 1 illustrates a metal rod on which the coating 2 is applied.

I have found after many experiments that silicon, or in its more common form, silica, acts as a very quieting agent, even better than aluminum, on the molten metal closely adjacent the puddle formed by the arc; that is to say, boiling is prevented by the presence of silica. I, therefore, apply to one side only of the welding electrode, a coating containing preferably a considerable amount of silica. I have found that such a coating is readily applied when the silica is in the form of silicate of soda. In some cases I have mixed with the silicate of soda, precipitated carbonate of calcium, and for certain classes of work I have used in addition to the above mentioned ingredients a small amount of a material having great affinity for oxygen, such as boron, or magnesium, however these materials having great affinity for oxygen may or may not be used, depending on the cleanliness of the metal that is to be welded or repaired. This partial coating may also include ingredients to be applied in such a way as to produce in the weld, alloys of steel or other alloys so that the weld is the same as the metals to be welded or the weld can be made of special constituency for special purposes, as for example, copper deposited with the steel tends to reduce corrosion to a large extent.

It will be readily perceived that the silicate of soda or a mixture of silicate of soda and carbonate of calcium, with or without the material having great affinity for oxygen, as heretofore mentioned, produces a very thin mixture which is adapted to be sprayed or brushed onto the welding electrode. I prefer to apply this coating on a part of the circumference of the electrode, leaving the other part bare, but in as much as the coating applied is very thin and contains no slag it may, for certain classes of work, be applied over the entire surface of the rod in which case, however, it, in no sense, constitutes a sleeve for holding the arc.

In operation, I take a welding electrode which has been covered and dried as above indicated, and connect the same to one terminal of the source of current; the other terminal of which is connected to the work to be welded or repaired and after striking the arc with the bare side of the electrode, I advance the bare side of the electrode along the seam, joint or piece to be welded or repaired.

As heretofore stated, no slag is produced by the coating on my improved electrode and the coating is readily brushed off with a metal or stiff brush, after the weld has been made, whereas with a "slag" or "envelope" covered electrode the "slag" or "envelope" gets into the puddle making a porous weld, and has to be chipped off with a hammer or with a hammer and chisel.

It will be readily observed that the electrode herein described is very cheaply prepared, which is most important when it is understood that in metallic arc welding on ships, locomotive and such work, thousands of feet of welding electrodes are used up daily. Furthermore since in my preferred form of electrode, one half of the electrode is bare no time is lost in striking the arc as when "slag" or "envelope" covered electrodes are used.

While I have shown and described an electrode for metallic arc welding having a coating containing a large amount of silica, yet I do not wish to be limited to this particular substance or a mixture of the other substances hereinbefore mentioned as regards to my preferred form having a partial coating, as others may later be found which will work as well, but I believe I am the first to discover the advantages of and to use a partially coated electrode no matter what the make up of the coating is.

Having thus described my invention, what I claim is:—

1. A welding electrode comprising a fusible rod having a coating containing a silicate and at least a second substance co-operating therewith to produce a strong homogeneous weld having no slag thereon heavy enough to require chipping off.

2. An electrode for use in electric arc welding and repairing comprising a metal rod having a coating composed of silicate of soda and carbonate of calcium.

3. An electrode for use in electric arc welding and repairing comprising a metal rod having a coating composed of silicate of soda, carbonate of calcium and magnesium.

4. An electrode for use in electric arc welding and repairing comprising a metal rod having a coating extending over only a part of the surface of the rod.

5. An electrode for use in electric arc welding and repairing comprising a metal rod having a partial coating consisting principally of silica, preferably in the form of silicate of soda, and carbonate of calcium.

6. An electrode for use in electric arc welding and repairing comprising a metal rod having a partial coating consisting principally of silica, preferably in the form of silicate of soda, carbonate of calcium and a material having a great affinity for oxygen.

7. An electrode for use in electric arc welding and repairing comprising a metal rod having a coating composed of silicate of soda and carbonate of calcium, said coating having mixed therewith some metal in a finely divided state.

8. An electrode for use in electric arc welding and repairing comprising a metal rod having a coating composed of silicate of soda, carbonate of calcium and a material having a great affinity for oxygen, said coating having mixed therewith some metal in a finely divided state.

9. An electrode for use in electric arc welding and repairing comprising a metal rod having a partial coating consisting principally of silicate, preferably in the form of silicate of soda, and carbonate of calcium, said partial coating having mixed therewith some metal in a finely divided state.

10. An electrode for use in electric arc welding and repairing comprising a metal rod having a partial coating consisting principally of silica, preferably in the form of silicate of soda, carbonate of calcium and a material having a great affinity for oxygen, said partial coating having mixed therewith some metal in a finely divided state.

11. An electrode for electric arc welding and repairing comprising a metal rod having a thin coating containing a material which quiets the molten metal reaction, another material which floats the undesirable metal impurities to the top of the puddle and a further material which has a greater affinity for air or oxygen than the ingredients of the metal electrode or parent metal.

12. An electrode for electric arc welding and repairing comprising a metal rod having a thin coating thereon.

13. An electrode according to claim 12 in which only a portion of the rod is coated.

14. The process of electric welding which consists in coating a metal electrode with silica and calcium carbonate leaving a portion exposed, striking an arc between said exposed portion and the work and thereafter maintaining said arc to cause the metal of the electrode to flow onto the work accompanied by its fused coating, to prevent oxidization.

15. An electrode for use in electric arc welding and repairing, comprising a metal rod having a thin partial coating consisting principally of silica, preferably in the form of silicate of soda, and carbonate of calcium.

16. An electrode for use in electric arc welding and repairing, comprising a metal rod having a thin coating consisting principally of silica, preferably in the form of silicate of soda, and carbonate of calcium.

17. An electrode for use in electric arc welding and repairing, comprising a metal rod having a partial coating consisting principally of silica, preferably in the form of silicate of soda, carbonate of calcium and boron.

18. An electrode for use in electric arc welding and repairing, comprising a metal rod having a partial coating consisting principally of silica, preferably in the form of silicate of soda, carbonate of calcium and magnesium.

19. An electrode for use in electric arc welding and repairing, comprising a metal rod having a coating composed of silicate of soda, carbonate of calcium and boron, said coating having mixed therewith some metal in a finely divided state.

20. An electrode for use in electric arc welding and repairing, comprising a metal rod having a coating composed of silicate of soda, carbonate of calcuim and magnesium, said coating having mixed therewith some metal in a finely divided state.

21. An electrode for use in electric arc welding and repairing, comprising a metal rod having a partial coating consisting principally of silica, preferably in the form of silicate of soda, carbonate of calcium and boron, said partial coating having mixed therewith some metal in a finely divided state.

22. An electrode for use in electric arc welding and repairing, comprising a metal rod having a partial coating consisting principally of silica, preferably in the form of silicate of soda, carbonate of calcium and magnesium, said partial coating having mixed therewith some metal in a finely divided state.

23. The method of electric arc welding or repairing which consists in partially covering a metal rod with a material so an arc may be readily struck at any time while the rod is being consumed, connecting said rod in a welding circuit, establishing an arc between the rod and work to cause the metal rod to flow into the work while at least a part of the coating settles as a readily removable covering over the cooling metal of the weld.

24. The method of electric arc welding and repairing which consists in providing a welding or repair electrode, connected to one terminal of a source of electric current, and having a reaction and flux coating partially covering the electrode, moving the said electrode with the bare side forward over the work to be welded or repaired which is connected to the other terminal of the source of electric current, whereby the said coating is prevented from getting ahead of the puddle and into the weld but is deposited over the cooling weld metal to keep oxygen, occluded gases or the coating from getting into the molten metal.

25. The process of electric welding or repairing which consists in coating a metal electrode with a thin coating having a fluxing action on the molten metal of the weld, leaving a portion of the metal exposed, striking an arc between such exposed portion and the work and thereafter maintaining said arc to cause the metal of the electrode to flow onto the work accompanied by at least a small portion of the material from said coating to prevent oxidation of the weld.

26. The method of electric arc welding and repairing which consists in providing a welding or repair electrode connected to one terminal of a source of electric current and having a partial coating consisting of ingredients which assist in making a weld of a predetermined constituency and without slag therein, striking an arc with the uncovered part of the said electrode and moving the bare side forward over the work to be welded or repaired which is connected to the other terminal of the source of electric current.

27. The method of electric arc welding and repairing which consists in providing a welding or repair electrode connected to one terminal of a source of electric current, said electrode having its peripheral surface only partially covered by a material acting to produce a smooth weld, striking an arc between the uncovered portion of the electrode and the material to be welded or repaired connected to the other terminal of the source of electric current, and moving the partially covered electrode and arc along the seam, joint or place to be welded or repaired.

28. An electrode for use in arc welding and repairing, comprising a metal rod having a coating composed of a silicate, an alkaline earth and a further material having a great affinity for oxygen.

29. A welding electrode comprising a fusible rod having a coating containing a binder and at least a second substance cooperating therewith to produce a strong homogeneous weld having no slag heavy enough to require chipping off.

30. A welding electrode comprising a fusible rod having a thin coating of such characteristics and in such quantity as to leave on the finished weld no slag heavy enough to require it to be chipped off.

31. In metal electrodes for arc welding, a casing having one side removed to expose the metal of the electrode for the purposes as set forth.

32. A welding electrode comprising a fusible rod having a coating containing an oxygen containing compound of silicon of such characteristics and in such quantity as to leave on the finished weld no slag heavy enough to require it to be chipped off.

33. A welding electrode comprising a fusible rod having a coating containing silicate of soda and a second substance cooperating therewith to produce a strong homogeneous weld having no slag thereon heavy enough to require chipping off.

34. A welding electrode comprising a fusible rod having a coating containing silicate of soda and a second substance associated therewith to aid in producing a strong homogeneous weld, said coating adhering to said rod without mechanical fastening means and in such small quantities as to permit successive layers to be welded without removing such resultant scale as may form on such successive layers.

35. An electrode for use in arc welding and repairing, comprising a metal rod having a coating composed of a silicate and calcium carbonate.

36. An electrode for use in arc welding and repairing, comprising a metal rod having a coating composed of a silicate and an alkaline earth.

In witness whereof I affix my signature.

CLAUDE J. HOLSLAG.